United States Patent
Gamboa Tuesta et al.

(10) Patent No.: US 8,463,561 B2
(45) Date of Patent: Jun. 11, 2013

(54) STAND-ALONE RENEWABLE-ENERGY GENERATING DEVICE INCLUDING EMISSION SAVINGS SENSOR, RETROFIT EMISSIONS SAVINGS SENSOR FOR SUCH A DEVICE, AND METHOD

(75) Inventors: Dirk Gamboa Tuesta, Berlin (DE); Markus Schulz, Berlin (DE)

(73) Assignee: Changers LLC, Palo Alto, CA (US)

( * ) Notice: Subject to any disclaimer, the term of this patent is extended or adjusted under 35 U.S.C. 154(b) by 646 days.

(21) Appl. No.: 12/713,610

(22) Filed: Feb. 26, 2010

(65) Prior Publication Data

US 2011/0213506 A1  Sep. 1, 2011

(51) Int. Cl.
*G06F 19/00* (2011.01)
*G05D 11/00* (2006.01)
*G08B 23/00* (2006.01)

(52) U.S. Cl.
USPC .............................. 702/61; 340/556; 700/287

(58) Field of Classification Search
USPC ................ 702/61; 700/287; 340/556; 60/721
See application file for complete search history.

(56) References Cited

U.S. PATENT DOCUMENTS

2005/0133088 A1* 6/2005 Bologeorges .................. 136/291
2010/0194565 A1* 8/2010 Houston ........................ 340/556

* cited by examiner

*Primary Examiner* — Bryan Bui
(74) *Attorney, Agent, or Firm* — Edell, Shapiro & Finnan LLC

(57) ABSTRACT

A stand-alone renewable-energy generating device which generates electric energy from renewable energy sources, such as the sun or wind, in a stand-alone context. To allow users to asses their contribution to carbon dioxide emission savings, a sensor element that is configured to generate emission savings data representative of electric energy units generated by using a renewable energy device. Further, a clock device is configured to generate a time data representative of at least one of a time and a date specification and unique sensor-ID data are stored in a memory. A processor unit is configured to time-stamp the emission savings data by combining it with the time data. The processor unit retrieves the sensor-ID data to combine them with the emission savings data to form savings profile data. A communication interface is configured to communicate the savings profile data directly or indirectly via a network system.

21 Claims, 5 Drawing Sheets

STAND-ALONE RENEWABLE-ENERGY GENERATING DEVICE INCLUDING EMISSION SAVINGS SENSOR, RETROFIT EMISSIONS SAVINGS SENSOR FOR SUCH A DEVICE, AND METHOD

BACKGROUND OF THE INVENTION

1. Field of the Invention

The invention relates to a stand-alone renewable-energy generating device and an emission savings sensor, which can be used to collect data on emission savings from using stand-alone renewable energy sources and to methods for collecting and using such data.

2. Description of the Background Art

Stand-alone renewable-energy generating devices, i.e. devices that generate energy from renewable energy sources and are used autonomously without being connected to a power grid are known, e.g., from US 2007/0012349 A1. There, solar-powered sensors are shown that are connected to the internet. The sensors are used to monitor different parameters in the environment, such as sound and light.

Another typical stand-alone renewable-energy generating device for household us-age is described in US 2005/0133088 A1 where solar-powered water features, such as, garden fountains, are powered by submersible solar cells.

Moreover, stand-alone devices are known, which employ photovoltaic cells in order to load rechargeable batteries, or simultaneously power and reload electronic de-vices such as mobile phones, media players, e-book readers and other computing, entertainment and communications devices.

Although stand-alone renewable-energy generating devices are known in the prior art, their contributions to the overall savings in e.g. carbon dioxide emissions is not known and difficult to determine. It is up to the environmental consciousness of the individual consumer to employ these devices instead of relying on non-renewable energy sources, such as non-rechargeable batteries, or on an urban power grid which is powered by non-sustainable and non-renewable energy sources such as nuclear and fossil fuels, like uranium, gas, coal or oil. The individual consumer does not have any means to evaluate his or her contribution to the overall emission savings gained by the use of these devices within a greater community.

Thus, there is a need for a technology that enables the individual consumer to know his or her contribution to the overall emission savings used by stand-alone renew-able-energy generating devices, and to provide a feedback mechanism to the individual consumer which motivates further use of stand-alone devices powered by re-newable energy sources instead of non-sustainable energy sources. Increased use of renewable energy resources will help to save carbon dioxide emissions

SUMMARY OF THE INVENTION

The inventive apparatus and method may be used to measure data that are representative of energy units generated by generators from renewable energy sources such as solar energy or wind energy. Typical units, in which energy is measured, are Watt hours [Wh], Joule [J], and Erg [erg]. The inventive apparatus and method further may be used to communicate the data to a network system, such as the internet, or a layer of networks such as a local network of Wi-Fi-, Bluetooth-, LAN- or equivalently connected devices which form subnets that in turn are connected to each other and to another network.

In one embodiment, a stand-alone renewable-energy generating device, particularly for household applications, may comprise a generator that is adapted to convert energy from a renewable energy source to electrical energy, an output node at which the electrical energy is directed to at least one consuming device, an electric element that is interconnected between the generator and the output node, a clock device that is adapted to generate a time data representative of at least one of a time and a date specification, and a sensor element that is operatively connected to the electric element and adapted to generate emission savings data representative of electrical energy units directed from the generator to the output node, a memory in which unique sensor-ID data are stored, a processor unit that is adapted to time-stamp the emission savings data by combining it with the time data and that is adapted to combine the sensor-ID data with the emission data to form savings profile data, and a communication interface that is adapted to communicate the savings profile data directly or indirectly to a network system.

In the context of the invention, the output node is not limited to a specific configuration. It designates a location at which the energy from the generator is made avail-able to the consuming device. It may, for example, comprise an electric terminal and/or connector or a connection to an electric line or a conductor which is directly connected or contactable to a consuming device; it may also comprise an electric plug or connector, to which the consuming device may be connected.

The specific nature of the consuming device is also not restricted to specific embodiments. Any device which is adapted to consume the energy generated by the generator, such as a reloadable battery, a home appliance, a mobile communication, media, entertainment and/or computing device qualifies as the consuming device. The consuming device may be integrated into the stand-alone renewable-energy generating device or be a separate entity. The consumer device may be part of a complex battery system as e.g. found in yachts, cars and trucks and planes and gliders.

In operation, the sensor element monitors the electric energy flowing from the generator to the output node. The electric energy originates from renewable energy sources and is representative of the energy that is consumed by the consuming devices. The emission savings data and the savings profile data in which the amount of this energy is encoded are thus a measure of the carbon dioxide emissions saved by usage of renewable instead of non-renewable energy sources. By combining the measured electrical energy units with the unique sensor-ID, the savings profile data allow the identification of the stand-alone renewable-energy generating device by a device which receives these data.

In order to retain information, when the measured electrical energy units were generated, the emission savings data are time-stamped to analyze the temporal development of the emission savings. The time-stamping of the energy units allow to reconstruct a profile, i.e. the change over time, of the emission savings as represented by the measured energy units.

The communication interface allows to dispatch the savings profile data to the net-work system for further processing. The network system comprises any machine communication system in which devices are interconnected to enable an at least one-directional data stream. The communication interface may also make use of an intermediate network system to gain access to a second network system. For example, the communication system may use a GSM-type connection to establish an Ethernet connection into the World Wide Web.

The communication to and from the network system may not need to take place in real time. It is possible to store the savings profile data in the memory and accumu-late the preferably time-stamped electrical energy units between times at which the device is connected to the network system. If a connection to the network system is established, the device may communicate the stored savings profile data.

The stand-alone renewable-energy generating device with the above features thus allows to assess its specific contribution to the generation of electric energy from renewable sources. This may be accomplished by an analysis of the savings profile data on a device which receives these data from the network system.

The stand-alone renewable-energy generating device as described above may be further improved by using additional features either individually or in arbitrary combination. In the following, examples of such additional features are given.

In one further embodiment, the electric element may comprise an energy storage assembly interposed between the output node and the generator and adapted to at least temporarily buffer the electric energy from the generator directed to the consuming device, wherein the sensor element is connected with the electric element at a first location between the generator and the energy storage device to generate first data representative of electric energy units directed from the generator to the storage device, and at a second location between the energy storage assembly and the output node to generate second data representative of the electrical energy units directed from the energy storage device to the output node, wherein the processor unit is adapted to compute at least one of a minimum and a difference of the energy units in the first and second data.

In this embodiment, the measurement accuracy in the actual emission savings data may be improved as only those energy units are considered that are actually consumed by the consuming device. Electric energy which has been saved in the energy storage assembly but has not been consumed may be disregarded and not be considered in the savings profile data. The energy storage assembly may be used as an energy buffer, e.g. in order to temporarily save energy at times, when the generator generates more electric energy than is consumed by the at least one consuming de-vice. If renewable energy source is not available, such as at night in the case of photovoltaic elements, the consuming device may be powered by the energy in the storage assembly. Thus, electric energy is continuously available to the consuming device independent of the availability of the renewable energy source.

Accuracy in the savings profile data may be further improved if, according to another embodiment, the electrical element further comprises a charge controller interconnected between the generator and the energy storage assembly. The sensor element is connected with the electric element at a location between the generator and the charge controller to generate the second data, wherein the sensor element is connected with the electric element at a third location between the charge controller and the energy storage assembly to generate third data representative of the energy units directed from the charge controller to the energy storage assembly, and wherein the processor unit is adapted to compute at least one of the minimum and the difference of the energy units in at least of two of the first, second and third data. The above embodiment may be applied to all types of charge controllers used in stand-alone systems, such as charge controllers in consumer electronic devices but also charge controllers in configurations which require a larger energy throughput such as in 12 V- or 24 V-DC-environments, as in car, truck or yachting applications or in large autonomous household appliances In this configuration, energy losses or limitations in the charge controller may be considered in the savings profile data.

Additionally, or alternatively, the energy storage assembly may comprise at least one of an integrated reloadable battery and a cradle, the cradle being adapted to removably receive at least one reloadable battery.

The stand-alone renewable-energy generating device may, according to a further additional or alternative embodiment be controlled via the communication interface. For this, the communication interface is preferably configured for bi-directional communication, i.e. to receive data from and send data to the network system. If control data are received, a switching element may be operated. The communication inter-face of the stand-alone renewable-energy generating device may be adapted to receive the control signal via the network system.

The switching element of the stand-alone renewable-energy generating device in an embodiment may be operatively connected to a display element that is arranged visibly from an outside environment of the stand-alone renewable-energy generating device. The display element may be used to provide optical feedback representative of the amount of electrical energy units generated by the stand-alone renewable-energy generating device identified by its unique sensor-ID so far. Thus, a feedback to the uses of the emissions that have been saved so far may be given. The display element may also provide status information on the operating state of the device. For example, the display element may signal that there is a connection to the network system, that the savings profile data are being sent or that the control data are being received.

In addition, or as an alternative, the output node may be controlled by the switching element. In particular, the output node may comprise a switchable power outlet. As a power outlet, a standard power socket, a power jack, an Ethernet plug with power-over-ethernet capabilities or a USB-connector and other types may be provided.

Some stand-alone renewable-energy generating devices allow to be alternatively powered by non-renewable energy sources, e.g. by being connected to the power grid through a standard power socket. According to a further aspect of the invention, the electric energy derived from this alternative power source is disregarded in the savings profile data, at least if the alternative power source does not use renewable energies.

In order to only consider energy units which result from renewable energy sources, the processor unit may comprise an identification module that is adapted to identify a character of the energy source. An energy source may be either of removable or non-removable character. This may be accomplished by a variation in time of at least one of the resistance, current and voltage in the energy directed to the output node, and to generate identification data representative of the character of the energy source.

For example, the identification module may use frequency filters or other elements to measure spectral energy distributions in order to detect typical power grid frequencies such as 50 Hz or 60 Hz in the energy signal. If these frequencies are present and if the energy content in these frequencies exceed a pre-determined threshold, the energy source may be identified as the power grid. Consequently, the energy units that contain these frequencies may not be included in the emission savings data or the savings profile data. Non-reloadable batteries sources such as Alkaline batteries may be identified by their resistance values and their drop-off in current and/or voltage over time.

In another embodiment, the identification module may alternatively or additionally comprise a source sensor which monitors the energy flow through two electric lines, one of the lines being connected to the generator, the other line being connected or adapted to be connected to a non-renewable source of electric energy. The source sensor may be adapted to generate a signal indicative of the line through which the energy is flowing to the output node. The source sensor may, in one configuration, be realized in practice, e.g. by an element which monitors the state of a trigger diode in at least one of the above two electric lines.

According to another aspect of the invention, an emission savings sensor may be provided as a retrofit element, e.g. to be plugged into the power output of a stand-alone renewable-energy generating device, and monitor the energy unit produced by the stand-alone renewable-energy generating device.

The emission savings sensor may comprise at least one input connector that is adapted to be plugged into the output connector of a stand-alone renewable-energy generating device, at least one output connector that is connected to the at least one input connector via at least one electric element and adapted to be connected to an input connector of a consuming device, and a sensor element that is connected to the electric element and adapted to generate an emission savings signal representative of the electrical energy transported from the at least one input connector to the at least one output connector, a clock device that is adapted to generate a time data representative of at least one of a time and a date specification, a memory in which a unique sensor-ID is stored, a processor unit that is adapted to time-stamp the energy savings signal by combining it with the time data and adapted to form a savings pro-file signal, in which the time-stamped energy savings signal and the unique sensor-ID are combined, and a communication interface that is adapted to communicate the savings profile signal to a network system.

The emission savings sensor according to the invention is a unit that may simply be plugged into an already existing stand-alone renewable-energy generating device to achieve the functionality of the described stand-alone renewable-energy generating device according to the invention. The emission savings sensor may be used with a variety of renewable-energy generating devices as deemed appropriate by the consumer. It may also be used for retrofitting existing devices.

The clock device may not necessarily include a chronometer but comprise a communication unit that receives a clock signal via the network system and/or the input or output connector. For communication purposes, the clock device may simply use the communication interface instead of having a separate communication unit. If for ex-ample the output connector provides both a communication and a power link to the consuming device, the clock device may retrieve a clock signal from the consuming device and convert it into the proper format for the time data to be used in the savings profile signal. The clock device may also retrieve a clock signal via the input connector in the same manner.

The processor unit of the emission savings sensor may, in one further embodiment, comprise an identification module that is adapted to identify the character of the source of the energy units measured by the sensor. The configuration and/or the function of this identification module may be identical to the configuration and/or function of the identification module described above in the context of the stand-alone renewable-energy device according to the invention.

The identification module may, additionally or alternatively, communicate with an energy source, e.g. a stand-alone renewable-energy generating device, via the input connector and retrieve identification data representative of the model, type or other device parameters of the device from the device's memory. This may be accomplished by using a standard communications protocol typical of the respective type of input connector. If, e.g., a USB-connector is used as an input connector, the emission savings sensor may access device data via the USB communication protocol. The energy source may be identified by comparing the retrieved identification data to a table maintained in the memory of the emission savings sensor, where, e.g. identification data of known stand-alone renewable-energy generating devices are stored. If the retrieved identification data match the data stored in the table, the energy source may be characterized as renewable and the energy units measured by the emission savings sensor may be considered in the savings profile signal. The table in the memory of the emission savings sensor may be automatically updated via the communication interface in real time or in batch mode at random or regular intervals.

The emission savings sensor may further comprise an electric energy buffer, such as a rechargeable battery, to be able to communicate via the network system if no energy is provided at the input or output connector.

In another embodiment, the invention is concerned with a method for identifying the energy savings contributions of a stand-alone renewable-energy generating device, comprising the steps of automatically measuring, by means of a sensor element, electric energy units that are generated by a stand-alone renewable-energy genera-tor device, automatically retrieving ID data representative of the sensor, automatically retrieving time data containing information on at least one of a time and date when the measuring was performed, automatically combining the measured electric energy units, the time data and the ID data to form a savings profile data and communicating the savings profile data to a communication network.

With this method, the energy units that have been generated by a generator relying on a renewable energy source, such as a photovoltaic module, can be measured and uniquely associated with the sensor. As the latter is usually associated with a specific consumer, the communication of the savings profile data via the network enables to assign the savings profile data to the consumer and to give a feedback to the consumer of its contribution to the overall emission savings within a greater community of other consumers using similar devices. The sensor element may be an integral part of the stand-alone renewable-energy generating device or the emission savings sensor as described above.

The method can be further improved if, according to another embodiment, the steps of automatically measuring the electric energy units comprises the step of automatically identifying the character of the energy generator device, and at least one of automatically measuring the electrical energy units, forming the energy savings signal and communicating the energy savings signal if, in the identifying step, the generator has been identified as operating on renewable energy. If, in contrast, the identifying step provides as a result that the energy does not come from a renewable energy generator but from an energy generator employing non-renewable energy sources, either the electrical energy units may not be measured and/or the energy savings signal may not be formed and/or the energy savings signal may not be communicated via the network.

The identification of the character of the generator may, as already described above, further comprise the step of identifying the energy source by monitoring at least one of a resistance, a current and a voltage generated by the renewable energy generator.

Additionally, or alternatively, the step of identifying the character of the generator may comprise the step of retrieving identification data from the energy generator, as has been explained above.

The method may further comprise the steps of receiving a control signal via the communication network and operating a switching element depending on the control signal. The switching in turn may operate a display visible from the environment of the emission savings sensor in order to provide feedback to the consumer on its efforts to save emissions, or to serve as a source of entertainment to the user. The above-described method may also reside in computer-readable format on a computer storage medium. The computer storage medium may be, but is not limited to, a magnetic or optical storage device and may in particular be read by media players, mobile phones, e-book readers and other communication, media and/or computing devices and, upon execution, carry out the steps of the method according to one of the embodiments described above.

Further, the invention relates to a method for collecting emission savings data representative of the energy generated by a stand-alone renewable energy generation de-vice, the method comprising the steps of maintaining user data of a group of users via a communication network, the user data of each user comprising unique ID data representative of a sensor element and emission savings data representative of a sum of energy units measured by the sensor element that is associated with the unique ID data; automatically collecting, via the communication network, a data set containing ID data representative of a sensor element, energy data representative of electrical energy units measured by the sensor element, and time data representative of the time at which the energy units were measured by the sensor element; identifying a user of the group of users by correlating the data set with the user data by means of the ID data in the user data and the ID data in the data set; adding the energy units in the energy signal to the energy units in the emission savings data of the user; sharing the emission signal in the group of users.

With this method, the energy units measured by the sensor element create a feed-back to the individual consumer employing the sensor element. The individual consumer may evaluate his or her individual contribution to lower the carbon dioxide emissions. The method may in particular be carried out on a computer device which is linked to the sensor element via the communication network. For example, the method may be executed on a real or virtual computing device acting as a web server.

By sharing the energy units generated by an individual user from renewable energy sources with the group of users, the individual consumer may not only assess his or her own contribution but also see the development within a community of likeminded consumers. Knowledge of the group behavior with regard to curb carbon-dioxide emissions may provide additional motivation for the individual consumers to use renewable energy sources.

Moreover, the above method may form a basis for an award system to reward users that excel in the usage of renewable energy sources. The usage may be evaluated by analysis of the savings profile data.

The user data may further comprise geographical data representative of the location of the user. The step of sharing the emission savings signal with the group of users may further comprise the step of sharing the geographical data with the group of users. For instance, the geographical data may be used to automatically define a com-munity, i.e. selected group of users, by picking users according to location, e.g. according to city, or zip code. Of course, other ways of grouping are also possible, such as groups that are voluntarily chosen by the individual user, by type or model of the emission savings sensor identified by its ID number or by type and/or model of the stand-alone renewable-energy generating device as identified by the ID number or by the identification module.

According to another embodiment of the method a control signal may be sent via the communication network, the control signal comprising the ID number and action data adapted to operate a switching element in a receiving device. For example, the cur-rent accumulated amount of electric energy units of a user, or measured by an individual sensor element may be sent and be displayed on the display element operated by the switching element. Another example may be to operate a power outlet only after positive identification of a renewable energy source via the identification module.

The stand-alone renewable-energy generating devices and/or the emission savings sensors according to the invention may also be adapted to exchange data directly with each other via the network system, for example on a peer-to-peer basis. This allows to use the devices and/or sensors as a communication device with at least limited communication capabilities. For instance, at least the savings profile data may be communicated directly between device and/or sensor.

In another embodiment, the method may further include the step of automatically sending the control signal after a predetermined threshold of energy units is exceeded in the user data. Thus, it may be signaled to the user of the emission savings signal that a specific goal in emission savings has been achieved and that, e.g. the user is rewarded with a gift.

Instead of identifying the character of the energy source in the stand-alone renew-able-energy generating device or in the emission savings sensor, the identification may also take place at the server side, if the data set includes information on the generator which generated the energy units in the savings profile data.

Finally, a plausibility check on the savings profile data may be carried out, in that with the ID number received from the device or sensor allows to determine its type and performance. For this, a database may be maintained at the server, and the energy units in the savings profile may be compared with the performance data associated with the specific ID number. If the energy units within the savings profile data exceed the performance of the type associated with the ID number, the data may be rejected as non-plausible and/or tampered.

The above-described method may also reside in computer-readable format on a computer storage medium. The computer storage medium may be, but is not limited to, a magnetic or optical storage device and may in particular be read by media players, mobile phones, e-book readers and other communication, media and/or computing devices and, upon execution, carry out the steps of the method according to one of the embodiments described above.

BRIEF DESCRIPTION OF THE DRAWINGS

The foregoing discussion will be understood more readily from the following detailed description of the invention, when taken in conjunction with the accompanying drawings, which are given as illustration only and are thus not limiting of the present invention, and wherein.

DETAILED DESCRIPTION

Figure 1:
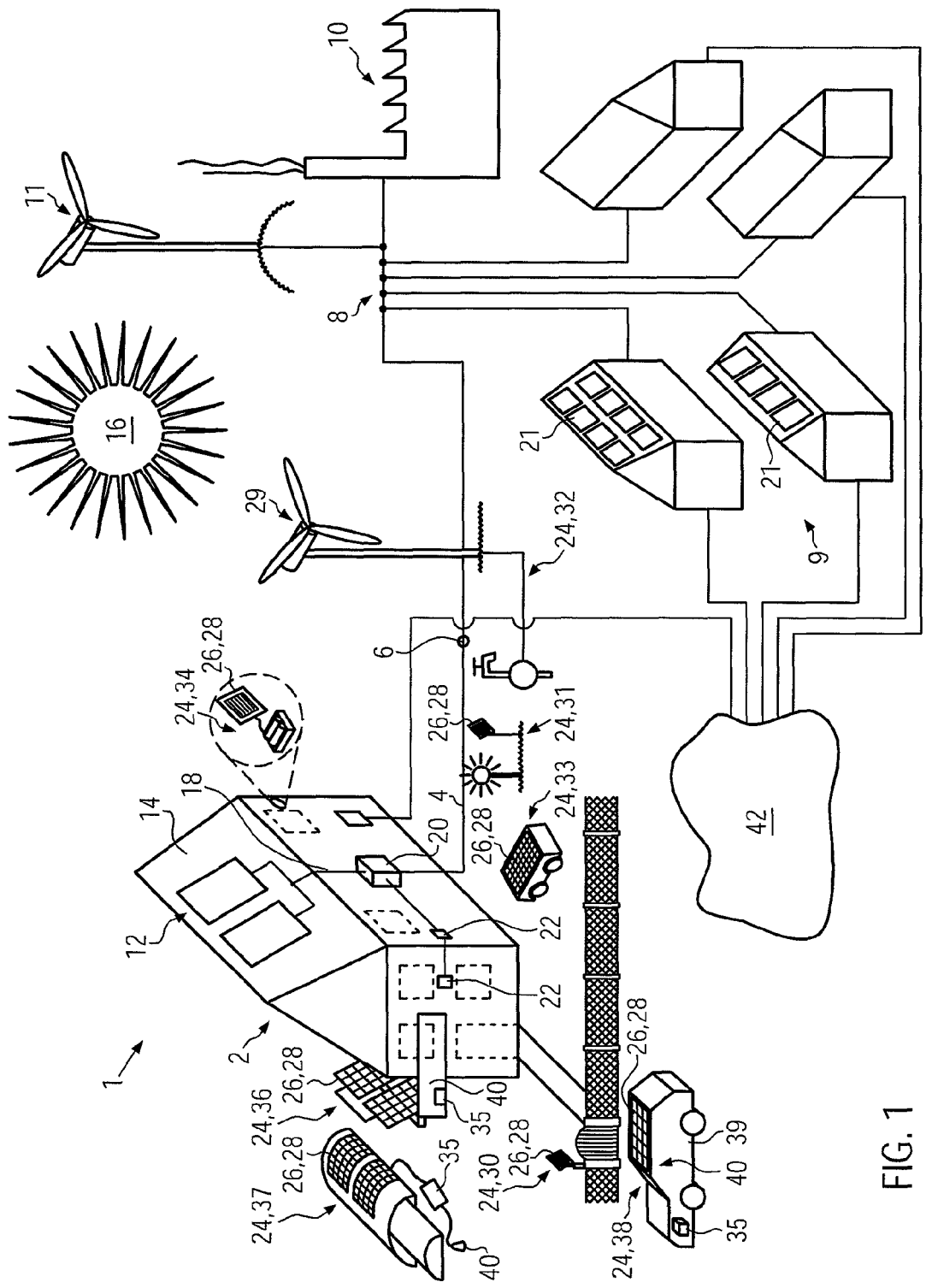
FIG. 1 shows schematically an environment in which the invention may be applied.

FIG. 1 exemplarily shows a household environment 1, in which the technology according to the invention is used preferably. Electrical energy in a home 2 may be provided mainly by an electrical power line 4, which at one point 6 is connected with a power grids, such as a publicly or privately owned power grid. The power grid 8 provides electrical energy to a plurality of homes 9. The electric energy in the power grid 8 is produced by a mix of e.g. central power stations 10 which generate electric energy from non-renewable energy sources such as radioactive fossil, fuels, e.g. coal or oil, as well as renewable energy sources such as wind turbines 11 and hydroelectric plants (not shown).

In addition, the home 2 may be provided with large photovoltaic elements 12 on a roof 14. The energy from the photovoltaic elements 12 is based on solar energy coming from the sun 16. The photovoltaic elements 12 convert solar energy into electric energy and direct the electric energy via a line 18 to an inverter 20 which either directs the electric energy into the power grid 8. The photovoltaic elements 12 of the home 2 are thus part of the power grid 8 and, together with the photovoltaic elements 21 of other homes 9, and the power stations 10, 11 contribute in the generation of energy within the power grid 8. In the home 2, electric energy from the power grid 8 is available at wall sockets 22.

Apart from the energy generators 10, 11, 12 of the power grid 8, stand-alone renew-able-energy generating devices 24 are regularly used in a home 2. The stand-alone renewable-energy generating devices 24 are typically not connected to the power grid 8 but create the electric energy for operation autonomously by using a generator 26 such as solar cells or photovoltaic modules 28 or small wind turbines 29. The generator 26 converts the renewable energy to electric energy.

The stand-alone renewable-energy generating devices 24 may, in one instance, be of limited size and power and be predominantly used for directly powering devices that consume only little energy. Such a stand-alone renewable-energy generating device 24 powers only one device or, a few devices. It forms, in a way, a power grid of its own. Examples of such stand-alone renewable-energy generating devices 24 shown in FIG. 1 include, but are not limited to, solar-powered illuminations 30 for street numbers, solar-powered garden lights 31, wind-powered wells 32, solar-powered lawn mowers 33 and solar-powered battery chargers 34 for charging re-loadable batteries 35, which charges also may be used for charging mobile, media and/or communication devices such as mobile phones, media players, e-book readers, laptops and the like. Of course the list of stand-alone renewable-energy generating devices is not limited to the devices shown in FIG. 1.

In addition to these devices, the stand-alone renewable-energy generating devices 24 which are of concern for the present invention may also include autonomous de-vices of larger power performance. For example, a stand-alone renewable-energy generating device 24 may comprise one or several photovoltaic modules 28 or generators 26, which may be flexible and light-weighted and a rechargeable energy storage such as battery 35 that is charged by the photovoltaic modules 28. The battery 35, in turn, may power e.g. a household appliance such as a refrigerator or a larger entertainment device such as a TV set, audio equipment, or a computer. Such a device is particularly useful e.g. in terrace or balcony 36 or camping 37 environment.

The stand-alone renewable-energy generating device further comprises vehicle-bound systems 38 as e.g. used in cars, tracks, planes, gliders, or yachts. Here, a photovoltaic element applied on or integrated in the vehicle body 39 is used to power the battery 35. The battery thus powered may be the main or an auxiliary source of energy in the vehicle.

In the above cases, the stand-alone renewable-energy generating devices 24 may include switchable power sockets 40, to which further consuming devices may be connected.

The home 2 is usually connected in various manners to a communication network 42, to which the other homes 9 have also access. For example, a mobile phone may use a telephone network on a cellular basis and may access other networks such as the worldwide web via the telephone network. Furthermore, the mobile phone, or other appliances in the home 2, may use other communication networks based on e.g. Bluetooth, W-LAN or infrared communication links to establish a peer-to-peer net-work within the home 2. The peer-to-peer network may be used by some devices to gain access to other networks via a peer that is connected to those networks. The home 2 may also have a landline for telecommunications, Ethernet or other digital services, giving the home 2 another way to access larger networks such as the worldwide web or other global networks. The network system 42 is meant to comprise any of the networks described above.

The invention is concerned with the stand-alone renewable-energy generating de-vices 24. According to the invention, the stand-alone renewable-energy generating devices 24 comprise a sensor element which keeps track of the energy units generated and/or consumed by the device 24 and shares this information via the network system 42. The sensor element can be uniquely identified. Time-stamping of the energy units to associate them with the time of their generation may also be possible. In the following, the use of such a sensor element and the storing of information are discussed in greater detail with reference to FIGS. 2 to 5.

Figure 2:
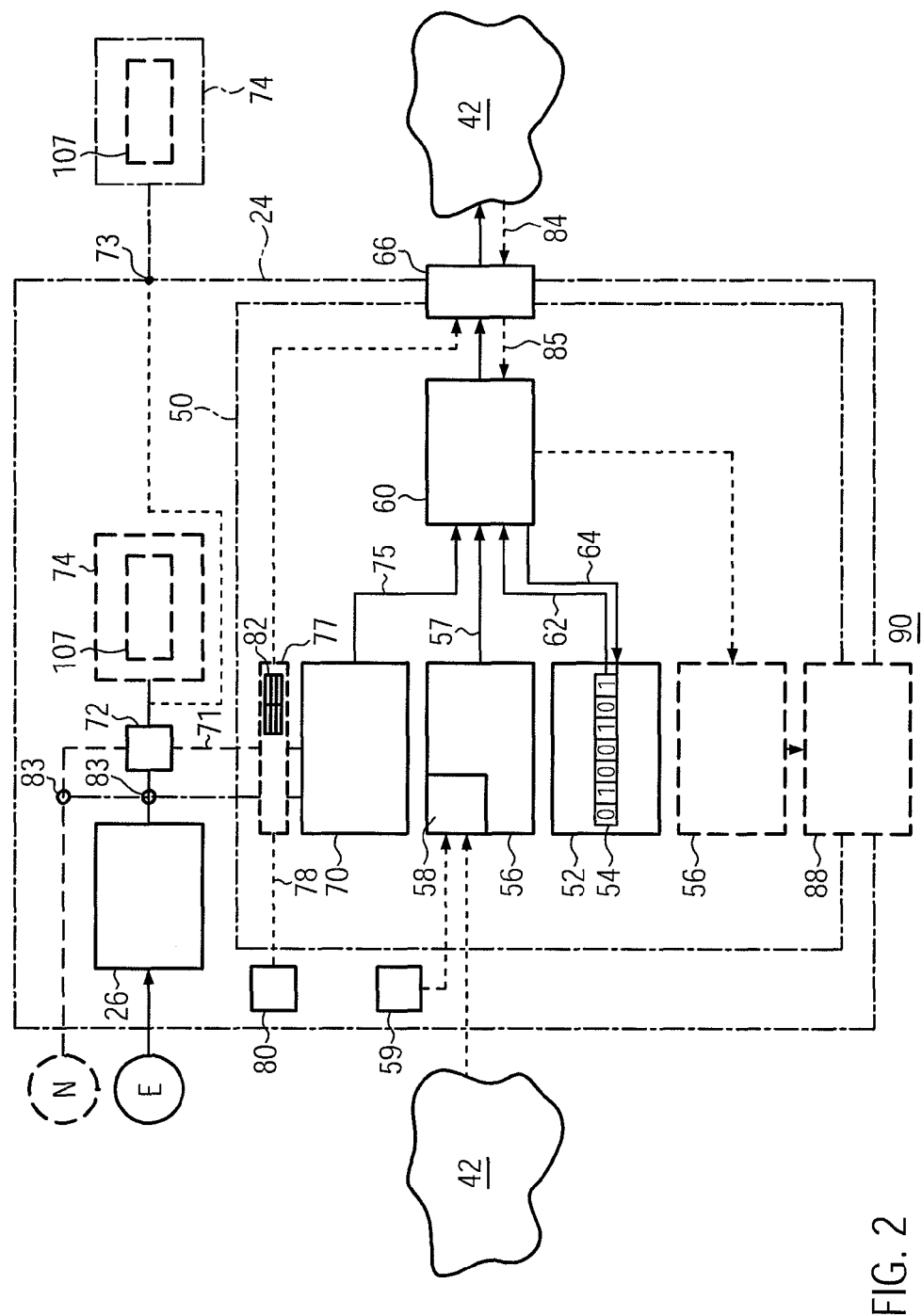
FIG. 2 shows schematically an embodiment of the invention.

FIG. 2 schematically shows the configuration of an emission savings sensor 50, which may be used as a separate device or be integrated into a stand-alone renewable-energy generating device 24 as indicated by the phantom lines. In FIG. 2 the reference numbers of FIG. 1 are used for functionally and/or structurally or identical elements.

The emission savings sensor 50 comprises a memory 52, which may be of the type regularly employed in computer devices, communication devices or entertainment devices. In the memory 52, unique ID data 54 are stored. The ID data 54 differ in each emission savings sensor 50 or device 24 and thus allow an unambiguous identification. In its simplest form, the ID data 54 may be a digital representation of a number, such as a serial number. In a more complex form, a unique string may be combined with information on the type of sensor 50 or device 24.

The emission savings sensor 50 further comprises a clock device 56 that is adapted to generate time data 57 representative of at least one of a time and a date specification. The clock device 56 must not necessarily comprise an internal chronometer but may instead comprise a communication interface 58 that allows to retrieve the at least one of the time and the date specification via a communication network 42 from a chronometer of an external apparatus. For example, the clock device may generate the time data from information gained via a USB or Bluetooth or other connection to a mobile phone that is charged by the stand-alone renewable-energy generating de-vice 24 (see FIG. 1). Alternatively, or additionally, the clock device 56 may retrieve the time data 57 from an internal chronometer 59 of the device 24 or the sensor 50.

Furthermore, a processor unit 60 is provided which is capable of performing logical operations. The processor unit may have at least one of read 62 and write 64 access to the memory 54.

The processor unit 60 may further be connected to a communication interface 66 that is adapted to communicate data directly or indirectly to a network system 42. A direct communication may take place if the communication interface directly connects into the network system 42. An indirect communication may take place if the communication interface 66 communicates with an interconnected device which is used as a gateway to the network system 42. For example, the communication interface 66 may communicate with a mobile phone and use the mobile phone to gain access to the worldwide web.

The emission savings sensor 50 comprises a sensor element 70 that is connected via a probing connection 71 to an electric element 72 of device 24 such as a line, or a conductor. Via the electrical element 72, electrical energy is transported from the generator 26 to an output node 73 and from there to a consuming device 74, in which the electric energy is consumed upon operation. The generator 26 generates the electric energy from a renewable energy source E. The consuming device 74 may not be part of device 24, but be a separate element, as indicated by the dashed and the phantom lines. The sensor element 70 is adapted to measure the electrical energy transported through the electric element 72, e.g. by measuring the voltage and the current and computing the energy units as a product of the voltage and the current. The sensor element is adapted to form emission savings data 75 representative of the electric energy units detected in the electric element 72.

In the processor unit 60, the time data 57 is combined by the emission savings data 75 with the concurrent time data. Thus, information on the time of their generation is added to the electrical energy units. The emission savings data 75 may be further combined by the processor unit 60 with the sensor ID data 54 to form savings profile data 76, in which the time and amount of electrical energy units detected by the sensor element 70 are combined with the unique identification of the emission savings sensor 50 or device 24.

The savings profile data 76 are communicated via the communication interface 66, either in real time or in batch mode, at fixed or random times, or whenever the communication interface 66 establishes a communication, to the network 42.

In FIG. 2, further optional elements are shown in dashed lines. For example, a hard-ware or software-implemented identification module 76 may be provided which is adapted to identify the character of the generator 26, i.e. to establish that the generator 26 indeed utilizes the renewable energy source E. In particular, the identification module 76 is adapted to identify an energy source as being a renewable energy source, such as a solar cell 28 (FIG. 1) or a wind turbine 30 (FIG. 1). For this, various routines may be run by the identification, either alternatively or combined:

For instance, the identification module 77 may be adapted to determine the character of the energy source E via a communication link 78 which allows the retrieval of identification data from a memory 80 if the device 24. This is particularly useful if the emission savings sensor 50 is a separate unit that can be connected to a variety of stand-alone renewable energy-generating devices 24. The identification module 76 may itself provide stored data 82 of known identification parameters of devices 24 which use renewable energy to create electric energy. The stored data 82 may be in the form of a look-up table and may be updated automatically via the communication interface 66.

The communication link 78 may, in a modification of the embodiment, also be established via the communication interface 66.

Alternatively or additionally to retrieving identification parameters via the communication link 78, the identification module 76 may also identify the character of the energy source by measuring at least one of a resistance, voltage or current via the probing connection 71.

If the electric energy units measured via the probing connection 71 contains energy above a predetermined or self-learningly determined threshold in certain frequency bands, e.g. typical power grid frequencies of 50 Hz or 60 Hz, the energy source is considered not to be a renewable energy source. Other methods for identifying renewable energy sources may include monitoring the resistance or the variation in time of at least one of the current and the voltage.

Only if a generator is identified by the identification module 77 as operating on renewable energy will the energy units generated by the generator 26 be considered in the savings profile data and communicated to the network 42. The exclusion of electric energy units may take place by not measuring the electric energy units as long as the energy sources is not identified as being renewable, not forming emission savings data in the processor unit if the energy source is not identified as being renew-able, and/or not forming savings profile data if the energy source is not identified as being renewable.

The device 24 may, in one modification, also be powered by a non-renewable energy source N, e.g. by being connected to a wall socket 22 (FIG. 1). In order not to consider the energy units from the non-renewable energy source N the identification module 77 may comprise one or more source sensors 83 which monitor the times or connections from the renewable and the non-renewable energy source E, N respectively. For example, the source sensor 83 may be trigger diodes which undergo a change in the operational state if energy passes through the respective line. The status change is registered by the respective source sensor 83 and by the identification module 77. Depending on the source sensor 83 activated, the identification module 77 identifies the source of energy as renewable or non-renewable.

Any of the elements of the emission savings sensor as described above may be realized as a program or an application being executed in an operating system environment such as provided in computing, communication and entertainment devices. In such an instance, the memory, processor unit, communication interface and clock device of the computing, communication or entertainment device may be used. The unique ID data may be provided by the software, e.g. by uniquely encrypting a unique ID of the device running the software or application.

In another optional embodiment, the communication interface 66 may be bi-directional as represented by dashed arrow 84 pointing from the network 24 to the communication interface 66. A bi-directional communication via the communication interface 66 is particularly useful if the emission savings sensor 50 or the stand-alone renewable-energy generating device 24 associated therewith takes some action in response to control data 85 received from the network 24. For this, the emissions savings sensor 50 may include a switching element 86, which in its simplest form may be a diode or a transistor, and is operated by the data 85, received via the communication interface 66. The switching element 86 may operate a display 88 which displays information depending on the state of the switching element 86. The display 88 is arranged on the sensor 50 or the device 24 such that it is visible from an outside environment 90. The display 88 may comprise one or more variously colored LEDs or one or more multi-segment displays. The display element 88 may also be used to feed back the amount of energy units generated by the generator 26.

Action upon receipt of the control data 95 may require that an ID number received as part of the control data corresponds to the ID data 54.

Figure 3:
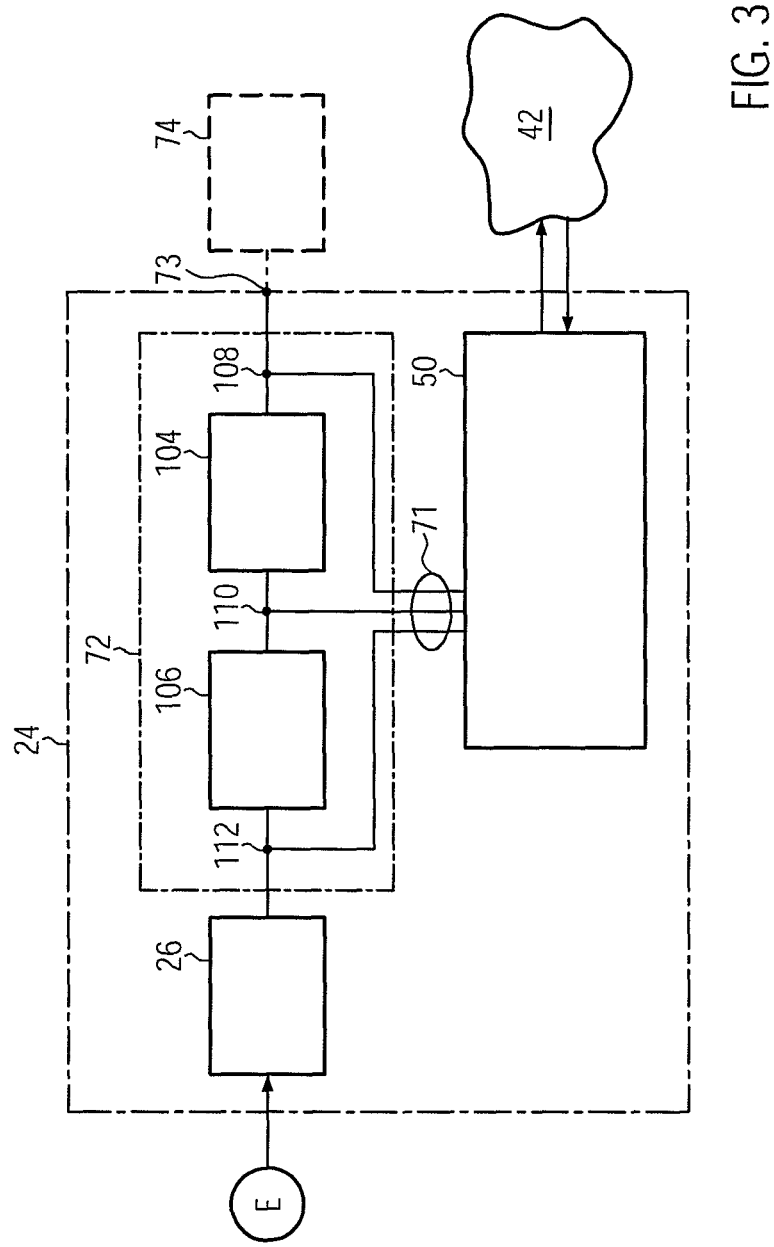
FIG. 3 shows schematically another embodiment of the invention.

FIG. 3 shows an embodiment of a stand-alone renewable-energy generating device 24 in which an emission savings sensor 50 is integrated. In FIG. 3, the reference numbers of FIGS. 1 and 2 are used for functionally and/or structurally equivalent or identical entities.

In FIG. 3, a generator 26 is shown to be connected to an optional consuming device 74 shown in dashed lines. The consuming device 74 needs not be present at all times but may occasionally be disconnected. At the output node 73, electric energy is available to the consuming device 74.

In the embodiment of FIG. 3, a temporary energy storage assembly 104, such as a reloadable battery is used. The size of the reloadable battery is not limited to a specific application. The reloadable battery may be of any size and/or power ranging from batteries for small solar-powered devices such as pocket calculators or alarm clocks having a power of several mAh, to reloadable batteries as e.g. used in cars, trucks, or yachts, having a power of several Ah, and if packed together, in the kAh range. The size of the generator 26 may depend on the size and/or power of the temporary energy storage assembly 104. If the renewable energy source is available and the generator 26 produces electric energy, the temporary storage assembly 104 is filled. If the renewable energy source is not available and the generator does not generate electric energy, the storage assembly 104 is depleted. By use of the temporary energy storage assembly 104, electric energy may be supplied to the consuming device 74 independently of the availability of the renewable energy source.

In order to use the temporary energy storage mode 104 most efficiently and in order not to overload it, a charge controller 106 may be used. The size charge controller 106 depends on the size of the reloadable battery or temporary energy storage assembly 104.

It is to be understood that the temporary energy storage 104 in FIG. 3 may also be omitted, if the consuming device 74 itself is or contains an energy storage assembly 104, such as a reloadable battery.

This situation is encountered if the stand-alone renewable-energy generating device is, e.g., a battery loading device using renewable energy, such as a solar-powered battery loader.

The rechargeable battery may be removably held in a cradle 107.

In order to accurately measure the electric energy that is actually consumed by the consuming device 74 and not either lost in the charge controller or temporarily stored in the temporary energy storage 104, the measurement of the electric energy units may simultaneously take place at more than one location within the device 72 via the probing connection 71. In the simplest version, the electrical energy units generated by generator 26 and consumed by consuming device 74 are measured at a location 108 directly before the output node 73, looking in the direction in which the electric energy is flowing. As shown in FIG. 3, this location may be between the charge controller 106 and in particular between the temporary energy storage 104 and the output node 73.

Furthermore, the emission savings sensor 50 may, via the probing connection 71, monitor the electric energy units generated by generator 26 at a location 110 between the charge controller 106 and the temporary energy storage 104. In this location, the emission savings sensor 50 measures the energy units that are put into the temporary energy storage 104 but not necessarily consumed by the consuming device 74.

Furthermore, the emissions savings sensor 50 may measure the electrical energy units generated by generator 26 at a location 112 immediately after entry into the electric element 72, for example between the generator 26 and the charge controller 106.

The emission savings sensor 50, in particular its processor unit 60 (FIG. 2), is adapted to generate the emission savings data 75 representative of the electric energy transported via the electric element 72 to the consuming device 74 by computing at least one of the minimum and the difference of the electric energy measured at least two of the locations 100, 110 and 112.

Figure 4:
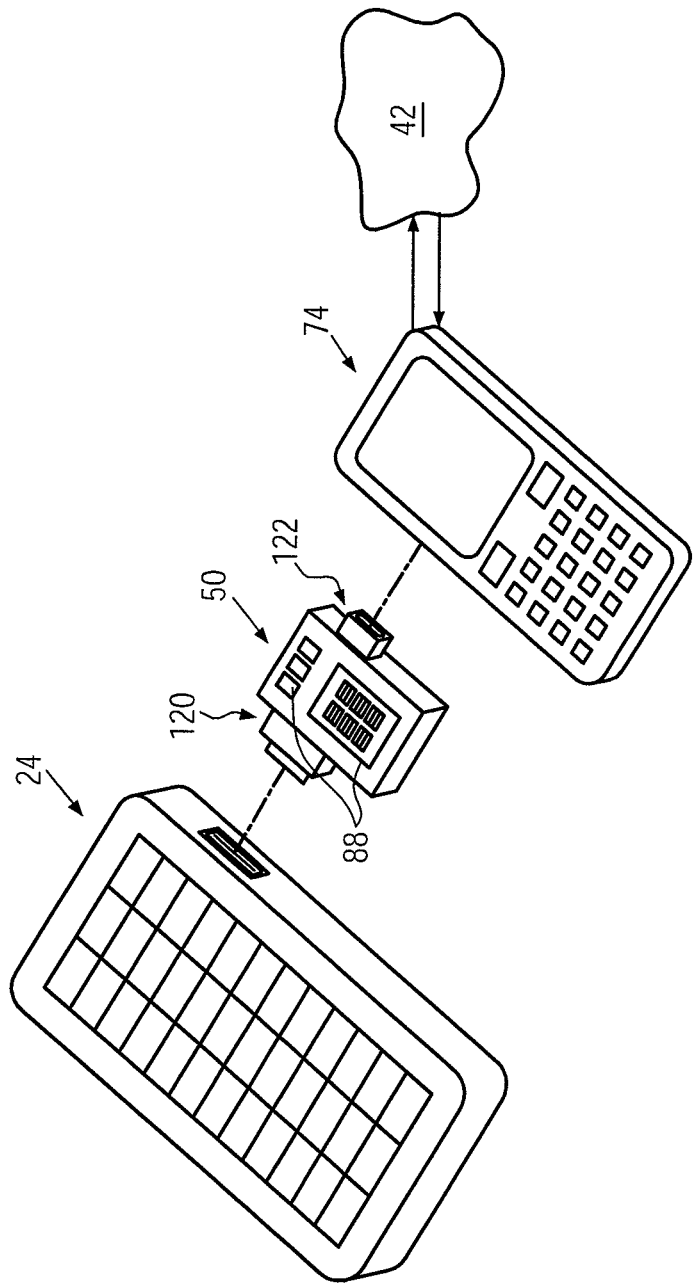
FIG. 4 shows schematically a further embodiment of the invention.

FIG. 4 shows an embodiment of a emission savings sensor 50. In FIG. 4, the reference numerals used in FIGS. 1 to 3 are used for element which are equivalent or identical in function and/or design.

In FIG. 4, the emission savings sensor 50 is in the form of an adapter which comprises an input connector 120. The input connector 120 is adapted to be connected with a stand-alone renewable-energy generating device 24. The input connector can be a standardized electric connector which is used for power transmission purposes only, such as a jack-type plug, or which is used for both communication and power transmission purposes, such as a USB connector or an Ethernet connector with a power-over-Ethernet feature.

The emission savings sensor 50 further comprises an output connector 122, which in particular may be of the mating type corresponding to the input connector 120. For example, if the input connector 120 is a male USB connector, the output connector 122 may be a female USB connector. Of course, the output connector 122 may also be of a different standard and the voltage and/or current may be adapted by the emission savings sensor 50 to meet the specifications associated with the output connector 122. The output connector 122 of FIG. 4 corresponds to the output node 73 of FIGS. 2 and 3.

The output connector 122 is adapted to be connected to the consuming device 74, for example a media player or a mobile phone. The consuming device 74 is usually provided with an internal rechargeable battery.

The emission savings sensor 50 transmits electrical energy from the stand-alone renewable-energy generating device 24 to the consuming device 74 and measures the amount of electrical energy units transmitted to the emission savings sensor 50.

To allow the use of the emission savings sensor 50 with various types of stand-alone renewable-energy generating device 24 and consuming devices 75, the input connector 120 and/or the output connector 122 may be arranged exchangeably, e.g. by a clip connection, on the emission savings sensor 50, and several different types of input connectors 120 and output connectors 122 may be provided.

The emission savings sensor 50 in the embodiment of FIG. 4 may be equipped with an active communication interface that is capable of logging directly into a network system, such as a Bluetooth network, a cellular communication network, or a wireless local or wide area network. To reduce energy consumption in the emission savings sensor 50, however, it is preferred that the communication interface 66 (FIG. 2) of the emission savings sensor 50, establishes a connection to the network 42 via the output connector 122 and the consuming device 74. For example, the consuming device 74 may be provided with software that recognizes the emission savings sensor 50 if connected to the consuming device 74 via output connector 50. The software further orders the consuming device 74 to establish a connection to the network 42 and communicate the energy savings profile and/or receive control data to an ad-dress specified by the software or the sensor 50. The software may be an application software that can be automatically downloaded if the sensor 50 is connected to the consuming device 74 for the first time or be resident in the memory 52 (FIG. 2) of the emission savings sensor 50 and is automatically executed on the consuming device 74 if the emission savings sensor 50 is connected to it.

In the embodiment shown in FIG. 4, the emission savings sensor 50 may be used in combination with stand-alone renewable-energy generating devices in which a sensor element 70 is not provided.

According to the embodiments of FIGS. 2 to 4, information about the amount of energy units generated by a renewable energy source E is generated and communicated to the network system 24.

In a further modification of the device 24 and/or the sensor 50, both are adapted to communicate directly to each other, e.g. on a peer-to-peer basis. In this modification, data are exchanged directly via the respective network interface 66. Such a data exchange may also be used for communication or entertainment purposes.

Figure 5:
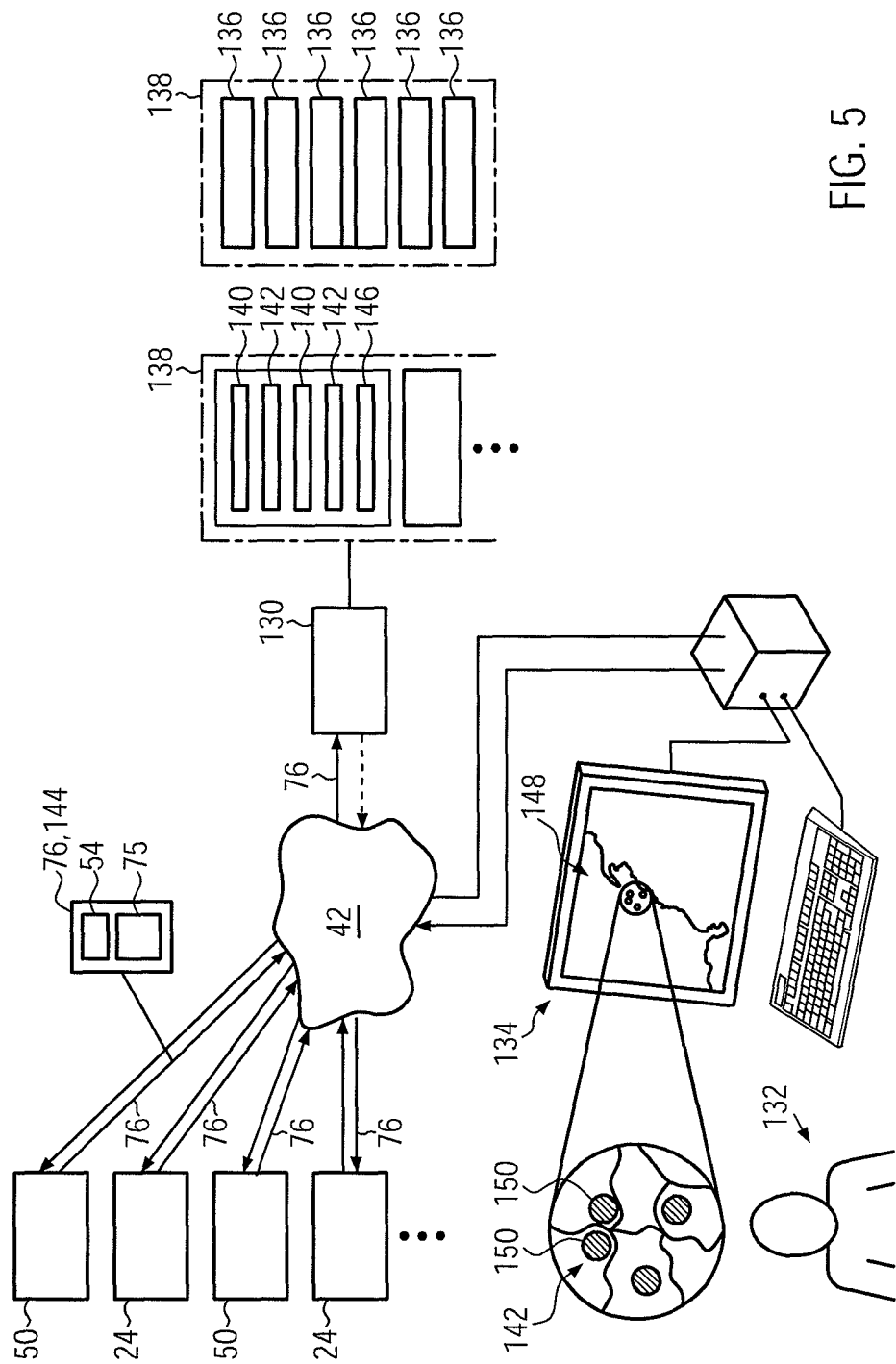
FIG. 5 shows schematically another embodiment of the invention.

With reference to FIG. 5, a system is described, which can be used to process the in-formation collected from various emission saving sensors 50 and stand-alone renewable-energy generating device 24, and to motivate consumers using more renewable-energy sources by sharing their energy savings and establishing a reward system.

In FIG. 5, the reference numerals of FIGS. 1 to 4 are used for entities that are identical or equivalent in function or design. A computer system 130 is connected to the net-work 42. The computer system 130 is a server system executing software that generates a platform, in which the savings profile data 76 of various stand-alone renewable-energy generating devices 24 and/or emission savings sensor 50 are received via the network 74. The platform is accessible by users 132 using communication devices 134 such as mobile phones or computers via the network 42. The software running on the server system 130 causes the communication device 134 of the user to display information gained from the savings profile data 76.

On the server system 130, user data 136 of a group 138 of users are maintained. Several groups 138 may be present at one given instance. For each user 132, the user data comprise at least one ID number representative of a renewable energy sensor 50 that is associated with the user. Of course, several ID numbers are associated with a user, if the user owns more than one device 24 or sensor 50 identified by ID data 54. This data may be entered by the respective user on his or her communication device 134 once the renewable energy sensor 50 has been purchased and access to the server system 130 has been established via the network 42.

In the user data, the server system 130 further maintains emission savings data 142 that are representative of a sum of energy units that were measured by the emission savings sensor 50 associated with the at least one ID number. The emission savings data 142 may be obtained automatically by the server system 130 in that an emission savings sensor 50 or a stand-alone renewable-energy generating device 24 automatically sends data sets 144 comprising the savings profile data 76 via the network 42 to the server system 130.

The server system 130 automatically collects the data sets 144 containing the saving profile data 76. The data set 144 or the savings profile data may contain a plurality of savings profile data.

In the server system 130 the data sets 144 are correlated with the user data 136. A user of the group 138 of users is identified by means of the ID number 140 in the user data 136 and the ID data 54 in the data set 144.

By comparison of ID numbers 54 and 140, the type and performance data of device 24 may be looked up in a database shared on the server system 130. The performance data may be used to verify the amount of energy units in the savings profile data: If the amount of energy units transmitted to the server system exceeds the maximum performance stored in the performance data, the energy units may be rejected. Thus, it is possible to prohibit that tampered data are considered in the server system. Of course, other data, such as the average of the previously measured energy units, may be used alternatively or additionally to verify the savings profile data.

Next, the energy units in the received data set 144 may be added to already existing, summed-up energy units in the emission savings data 142. Thus, the emission savings data 142 on the server system 130 always reflect the amount of energy units generated by a user using renewable energy sources.

Finally, the emission savings data 142 in the server system 130 may be shared with the group 138 of users. This leads to a competitive situation within the group of users that aims to motivate the users to increase their usage of renewable energy sources even for small stand-alone household devices 24.

The user data 136 may further comprise geographical data 146 representative of a location of the user. This geographical data may be entered upon the registration of the particular ID number of a renewable energy sensor 50 or stand-alone renewable-energy generating device 24 which has been newly purchased. On the server sys-tem, the geographical data 146 may be used for presenting the shared emission savings data on the user communication device 134. For example, the geographical data may be used to present the emission savings data on a map 148 to also give an indication of the activity of users in particular geographical regions. The emission savings data 142 of the user may be displayed on the map 148 on the location 150 corresponding to the geographical data 146.

Further, the server system 130 may broadcast the control signal containing at least the ID number of the stand-alone renewable-energy generating device 24 or emission savings sensor 50 at which the control data are aimed, and action data that are adapted to operate the switching element 86 in the receiving device 24, 50. The control signal may be sent automatically by the server computer 130 once a predetermined threshold of energy units in the emission savings data has been exceeded.

In addition or instead of the control signal, the server, just as any other device 24 or server 50, on a peer-to-peer basis, may broadcast other signals and data to specific devices 24 and servers 50, or a group of devices and servers 50, identified by their ID data. These signals may serve programming, such as software update, and/or in-formation and/or entertainment purposes.

The administration of the emission savings data may be used to implement an award system, in which users may be rewarded economically once a threshold of energy units has been exceeded in the emission savings data 142.

REFERENCE NUMERALS

1 Household environment
2 Home

4 Power line to number 2
6 Connection of number 4 to number 8
8 Power grid
9 Plurality of homes
10 Photovoltaic elements on roof
11 Wind turbine
14 Roof
16 Sun
18 Line
20 Inverter
21 Photovoltaic elements of other homes
22 Wall plugs
24 Stand-alone renewable-energy generating device
26 Generator
28 Solar cells, photovoltaic module of 24
29 Wind turbines
30 Solar-powered street number
31 Solar-powered garden light
32 Wind-powered well
33 Solar-powered lawn mower
34 Solar-powered battery charger
35 rechargeable battery of 24
36 balcony environment
37 camping environment
38 vehicle-bound system
39 vehicle-body
40 power socket of 24<
42 Communication network
44 Telecommunications landline
50 Emission savings sensor
52 Memory
54 ID data
56 Clock device
57 Time data
58 Communication interface of 56
59 Chronometer
60 Process unit
62 Reading link of 60 to 52
64 Right link of 60 to 52
66 Communication interface
70 Sensor element
71 Probing connection
72 Electric element
73 Output node
74 Consuming device
75 Emission savings data
76 Savings profile data
77 Identification module
78 Communication link
80 Memory of 24
82 Stored data (table)
84 Dashed arrow/bi-directional communication interface 66
85 Received data
86 Switching element
88 Display
90 Outside environment of 24 or 50
104 Temporary energy storage
106 Charge controller
107 cradle
108 Location
110 Location
112 Location
120 Input connector
122 Output connector
130 Server system
132 Users
134 User computer
136 User data
138 Group of users
140 ID number
142 Emission savings data in 130
144 Data set by 66
146 Geographical data
148 User
150 Location of user in 148

What is claimed is:

1. A stand-alone renewable-energy generating device comprising:
a generator that is configured to convert energy from a renewable energy source to electrical energy,
an output node at which the electrical energy is directed to at least one consuming device,
an electric element that is interconnected between the generator and the output node,
a clock device that is configured to generate a time data of at least one of a time and a date specification,
a sensor element that is operatively connected to the electric element and to generate emission savings data representative of electrical energy units directed from the generator to the output node,
a memory, in which unique sensor-ID data are stored,
a processor unit that is configured to time-stamp the emission savings data by combining with the time data and that is configured to combine the sensor-ID data with the emission savings data to form savings profile data containing the time-stamped emission savings data and the sensor-ID data, and
a communication interface that is configured to communicate the savings profile data directly or indirectly to a network system.

2. The stand-alone renewable-energy generating device according to claim 1, wherein the electric element further comprises:
an energy storage assembly interposed between the output node and the generator and configured to at least temporarily buffer the electric energy from the generator directed to the consuming device;
wherein the sensor element is connected with the electric element at a first location between the generator and the energy storage assembly to generate first data representative of electrical energy units directed from the generator to the storage device, and at a second location between the energy storage assembly and the output node to generate second data representative of the electrical energy units directed from the storage device to the output node, and
wherein the processor unit is configured to compute at least one of a minimum and a difference of the energy units in the first and second data.

3. The stand-alone renewable-energy generating device according to claim 2, the electric element further comprising:
a charge controller interconnected between the generator and the energy storage assembly,
wherein the sensor element is connected with the electric element at a location between the generator and the charge controller to generate the second data,
wherein the sensor element is connected with the electric element at a third location between the charge controller and the energy storage assembly to generate third data representative of the electric energy units directed from the charge controller to the energy storage assembly, and wherein the processor unit is configured to compute at least one of the minimum and the difference of the electrical energy units in at least two of the first, second and third data.

4. The stand-alone renewable-energy generating device according to claim 2,
wherein the energy storage assembly comprises at least one of at least one integral reloadable battery and a cradle, the cradle being configured to removably receive at least one reloadable battery.

5. The stand-alone renewable-energy generating device according to claim 1,
wherein the communication interface comprises a receiving module that is configured to receive a control signal via the network system, and
wherein the stand-alone renewable-energy generating device comprises a switching element configured to be switched on and off in response to the control signal.

6. The stand-alone renewable-energy generating device according to claim 5,
wherein the switching element is operatively connected to a display element that is arranged visibly from an outside environment of the stand-alone renewable-energy generating device and is controlled by said switching element.

7. The stand-alone renewable-energy generating device according to claim 5,
wherein the stand-alone renewable-energy generating device is provided with a power outlet that is at least one of directly or and indirectly powered by the generator and controlled by the switching element.

8. The stand-alone renewable-energy generating device according to claim 1,
wherein the processor unit comprises an identification module that is configured to monitor the electric energy directed to the consuming device, and configured to generate identification data representative of a character of an energy source of the energy directed to the consuming device.

9. An emission savings sensor, comprising:
at least one input connector that is configured to be plugged into an output connector of a stand-alone renewable-energy generating device,
at least one output connector that is connected to the at least one input connector via at least one electric element, and configured to be connected to an input connector of a consuming device, and
a sensor element that is connected to the electric element and configured to generate an emission savings signal representative of the electric energy transported from the at least one input connector to the at least one output connector,
a clock device that is configured to generate a time data representative of at least one of a time and a date specification,
a memory in which a unique sensor-ID is stored,
a processor unit that is configured to time-stamp the emission savings signal by combining it with the time data and configured to form a savings profile signal, in which the time-stamped energy savings signal and the unique sensor-ID are combined, and
a communication interface that is configured to communicate the savings profile signal to a network system.

10. The retrofit renewable energy sensor according to claim 9, wherein the processor unit further comprises an identification module that is configured to generate an identification signal representative of the character of a source of origin of the electric energy trans-ported from the input connector to the output connector.

11. A method for identifying the energy savings contributions of a stand-alone renewable-energy generating device, the method comprising the steps of:
automatically measuring, by means of at least one sensor element, electric energy units that are provided by a renewable energy generator device configured to convert energy from a renewable energy source to electrical energy,
automatically retrieving unique ID data representative of the sensor,
automatically retrieving time data containing information on at least one of a time and a date when the measuring was performed,
automatically combining the measured electric energy units, the time data and the ID data to form a savings profile data,
and communicating the savings profile data to a communication network.

12. The method according to claim 11, wherein the step of automatically measuring electric energy units generated by a renewable-energy generating device further comprises:
automatically identifying the character of the renewable energy generator, and
at least one of automatically measuring the electrical energy units, forming the energy signal and communicating the energy savings signal if in the identifying step, the renewable energy generator device has been identified.

13. The method according to claim 11, wherein the step of identifying a character of the renewable energy generator further comprises the step of:
identifying the renewable energy generator by monitoring at least one of a resistance, current and voltage generated by the renewable generator.

14. The method according to claim 11, wherein the step of identifying a character of the renewable energy generator further comprises the step of:
retrieving, via a communication link, identification parameters from the renewable energy generator.

15. The method of claim 11, further comprising the steps of:
receiving a control signal via the communication network,
operating a switching element depending on the control signal.

16. A computer storage medium, on which application data are stored in a computer-readable format, the application data being configured to cause a computer to carry out the method according to claim 11.

17. A method for collecting emission savings data representative of the energy generated by stand-alone renewable energy generation devices, the method comprising the steps of:
maintaining user data of a group of users, the user data of each user comprising:
unique ID data representative of a sensor element and
emission savings data representative of a sum of energy units measured by the sensor element that is associated with the at least one ID number;
automatically collecting, via the communication network, a data set containing:
a unique ID data representative of a sensor element,
energy signal data representative of electrical energy units measured by the sensor element, and time data representative of the time at which the energy units were measured by the sensor element;

identifying a user of the group of users by correlating the data set by means of the ID data in the user data and the ID data in the data set;

adding the energy units in the energy data in the emission savings data of the user identified in the previous step; and sharing the emission savings data with the group of users.

18. The method according to claim 17, wherein the user data further comprise: geographical data representative of a location of the user associated with an ID number; the step of sharing the emission savings signal with the group of users further comprises the step of:

sharing the geographical data with the group of users.

19. The method according to claim 17 further comprising the step of:

sending a control signal via the communication network, the control signal comprising:
the ID number and
action data configured to operate a switching element in a receiving device.

20. The method according to claim 19, further comprising the step of:

sending the control signal automatically after a predetermined threshold of energy units is exceeded.

21. A computer program data stored in a computer-readable storage medium causing the computer to carry out the method according to claim 17.

* * * * *